United States Patent
Lichte et al.

(10) Patent No.: US 8,176,844 B2
(45) Date of Patent: May 15, 2012

(54) HEATED HUMIDIFIED FOOD CABINET

(75) Inventors: Deron Lichte, Village of Lakewood, IL (US); Bruce Grau, Island Lake, IL (US); Souksomchay Luangnikone, Crystal Lake, IL (US)

(73) Assignee: Food Warming Equipment Company, Inc., Crystal Lake, IL (US)

( * ) Notice: Subject to any disclaimer, the term of this patent is extended or adjusted under 35 U.S.C. 154(b) by 604 days.

(21) Appl. No.: 12/359,625

(22) Filed: Jan. 26, 2009

(65) Prior Publication Data

US 2010/0186605 A1    Jul. 29, 2010

(51) Int. Cl.
*B60H 3/02* (2006.01)
*B60H 1/00* (2006.01)

(52) U.S. Cl. ............. 99/474; 219/400; 219/401; 99/468

(58) Field of Classification Search ............... 99/470, 99/474, 468, 476, 483; 219/214, 400, 401
See application file for complete search history.

(56) References Cited

U.S. PATENT DOCUMENTS

| | | | |
|---|---|---|---|
| 3,651,864 A | 3/1972 | Maddox, Jr. | |
| 3,760,155 A | 9/1973 | Polansky | |
| 3,952,609 A | 4/1976 | Klemm | |
| 4,038,968 A | 8/1977 | Rovell | |
| 4,373,430 A | 2/1983 | Allen | |
| 4,426,923 A | 1/1984 | Ohata | |
| 4,623,780 A | 11/1986 | Shelton | |
| 4,722,268 A | 2/1988 | Rightley | |
| 4,730,100 A | 3/1988 | Pingelton | |
| 4,835,351 A | 5/1989 | Smith et al. | |
| 4,979,436 A | 12/1990 | McGowan | |
| 5,365,039 A | 11/1994 | Chaudoir | |
| 5,532,456 A | 7/1996 | Smith et al. | |
| 5,660,103 A | 8/1997 | Koopman | |
| 6,023,985 A | 2/2000 | Fournier | |
| 6,114,659 A | 9/2000 | Finck et al. | |
| 6,133,555 A | 10/2000 | Brenn | |
| 6,323,464 B1 | 11/2001 | Cohn | |
| 6,369,362 B1 | 4/2002 | Brenn | |
| 6,474,222 B1 * | 11/2002 | Pretre | 99/331 |
| 6,670,585 B2 | 12/2003 | Burkett et al. | |
| 6,742,344 B2 | 6/2004 | Vormedal | |
| 7,205,507 B2 | 4/2007 | LoMaglio et al. | |
| 7,220,946 B2 | 5/2007 | Majchrzak et al. | |
| 7,325,749 B1 | 2/2008 | Alexander et al. | |
| 7,328,654 B2 | 2/2008 | Shei | |
| 7,370,867 B2 | 5/2008 | Olson et al. | |
| 2002/0005686 A1 | 1/2002 | Nuttall et al. | |

(Continued)

*Primary Examiner* — Kien Nguyen
(74) *Attorney, Agent, or Firm* — Greer, Burns & Crain, Ltd.

(57) ABSTRACT

A food container or cabinet may have a power cord extending and exiting from the cabinet at recess formed at a corner of side, top and back walls. The cabinet may be heated and humidified and operated with a control that operates air and water heating elements alternately and not simultaneously. The control may include a microprocessor and a digital storage device storing instructions for the microprocessor. An interface may be provided at the cabinet via which electronic signals can be directed to or received from the microprocessor or digital storage device. The container may be provided with a removable water receptacle and a water heating element positioned within the receptacle. The water heating element may be mounted in a pivotable fashion such that as the receptacle is removed from the container, the heating element is automatically pivoted out from within the receptacle and as the receptacle is returned to the container, the heating element is automatically pivoted into the receptacle.

25 Claims, 18 Drawing Sheets

U.S. PATENT DOCUMENTS

2005/0211109 A1 9/2005 Majchrzak et al.
2007/0092618 A1 4/2007 Burnell et al.
2008/0093927 A1 4/2008 Ewing et al.
2008/0185944 A1 8/2008 Olson et al.

* cited by examiner

HEATED HUMIDIFIED FOOD CABINET

BACKGROUND OF THE INVENTION

The present invention relates to food containers or cabinets in which the air is conditioned to permit storage of prepared foods in the cabinet until the foods are ready to be served or eaten.

Food cabinets of this type are typically heated or heated and humidified, with the air in the cabinets being circulated to maintain a consistency in the environment within the food container.

It is known to provide food cabinets in which heating elements are used for heating the air and heating water to increase the temperature and humidity within the cabinet. Typically in North America such cabinets are provided with a standard 110-120 V power connection so that they can be connected to a regular wall socket power supply in a restaurant, dining hall, cafeteria, or similar location. Usually such power supplies are protected by 15 or 20 amp circuit breakers. In typical cabinets the heating elements are capable of being operated simultaneously, which limits the total wattage of the heating elements to 2000 W. Since the heating elements may operate simultaneously, typically each of the heating elements is limited to a size of 1000 W.

Food cabinets that provide heat and humidity include controls that accept inputs from temperature sensors and humidity sensors in order to operate the heating elements and air blowers to heat, humidify and move the air within the cabinet to achieve a desired temperature and humidity as selected by a user of the equipment. Such controls are typically preset at the factory with control software which cannot be modified or updated in the field, without removal and replacement of hardware components, such as integrated circuits and memory modules, which requires a qualified service technician.

All food cabinets include a power cord connection to provide electrical power to the various components in the food cabinet. Typically the power cord exits from the cabinet though a rear wall or a side wall of the cabinet. Oftentimes the cabinets are mobile and they may be moved into different locations in a room. Other times the cabinets are stationary, however they may be placed in varying locations relative to walls and power outlets. With the power cord connection being located at a fixed location on the cabinet, the cord is sometimes interfering with the placement of the cabinet against a wall or in a corner since the protrusion of the cord from the wall of the cabinet prevents the cabinet from being pressed flush up against the wall.

SUMMARY OF THE INVENTION

In an embodiment of the invention, a food container is provided having walls defining an exterior of the container and an open interior for receiving food items. At least one opening in the walls provides access to move food items into and out of the interior of the container. An air moving device creates a moving air stream. Ductwork is configured to circulate the air stream in the container. The ductwork is configured to direct at least a portion of the air stream through the interior of the container adjacent to the food items. An air heating element is located in the air stream. A water receptacle receives a supply of water. The ductwork is configured to direct at least a portion of the air stream over the supply of water. A water heating element is arranged to add heat energy to the supply of water in the water receptacle. A control is arranged to operate the air and water heating elements alternately and not simultaneously.

In an embodiment of the invention, a food container is provided having walls defining an exterior of the container and an open interior for receiving food items. At least one opening in the walls provides access to move food items into and out of the interior of the container. An air moving device creates a moving air stream. Ductwork is configured to circulate the air stream in the container. The ductwork is configured to direct at least a portion of the air stream through the interior of the container adjacent to the food items. An air heating element is located in the air stream. A water receptacle receives a supply of water. The ductwork is configured to direct at least a portion of the air stream over the supply of water. A water heating element is arranged to add heat energy to the supply of water in the water receptacle. A control is arranged to control the temperature and humidity within the cabinet. The control includes a microprocessor and a digital storage device for storing instructions for the microprocessor. An interface is provided at an exterior of the cabinet via which electronic signals can be directed to or received from the microprocessor or digital storage device.

In an embodiment of the invention, a food conditioning container includes walls defining an exterior of the container and an open interior for receiving food items. At least one opening in the walls provides access to move food items into and out of the interior of the container. At least one electrically operated air conditioning element is positioned within the cabinet to condition at least one characteristic of the air. A power cord extends to the exterior of the cabinet and exiting from the cabinet at a corner of a side wall, the top wall and the back wall.

In an embodiment of the invention, the container may be provided with a removable water receptacle and a water heating element positioned within the receptacle. The water heating element may be mounted in a pivotable fashion such that as the receptacle is removed from the container, the heating element is automatically pivoted out from within the receptacle and as the receptacle is returned to the container, the heating element is automatically pivoted into the receptacle.

DETAILED DESCRIPTION OF THE PREFERRED EMBODIMENTS

Figure 1:
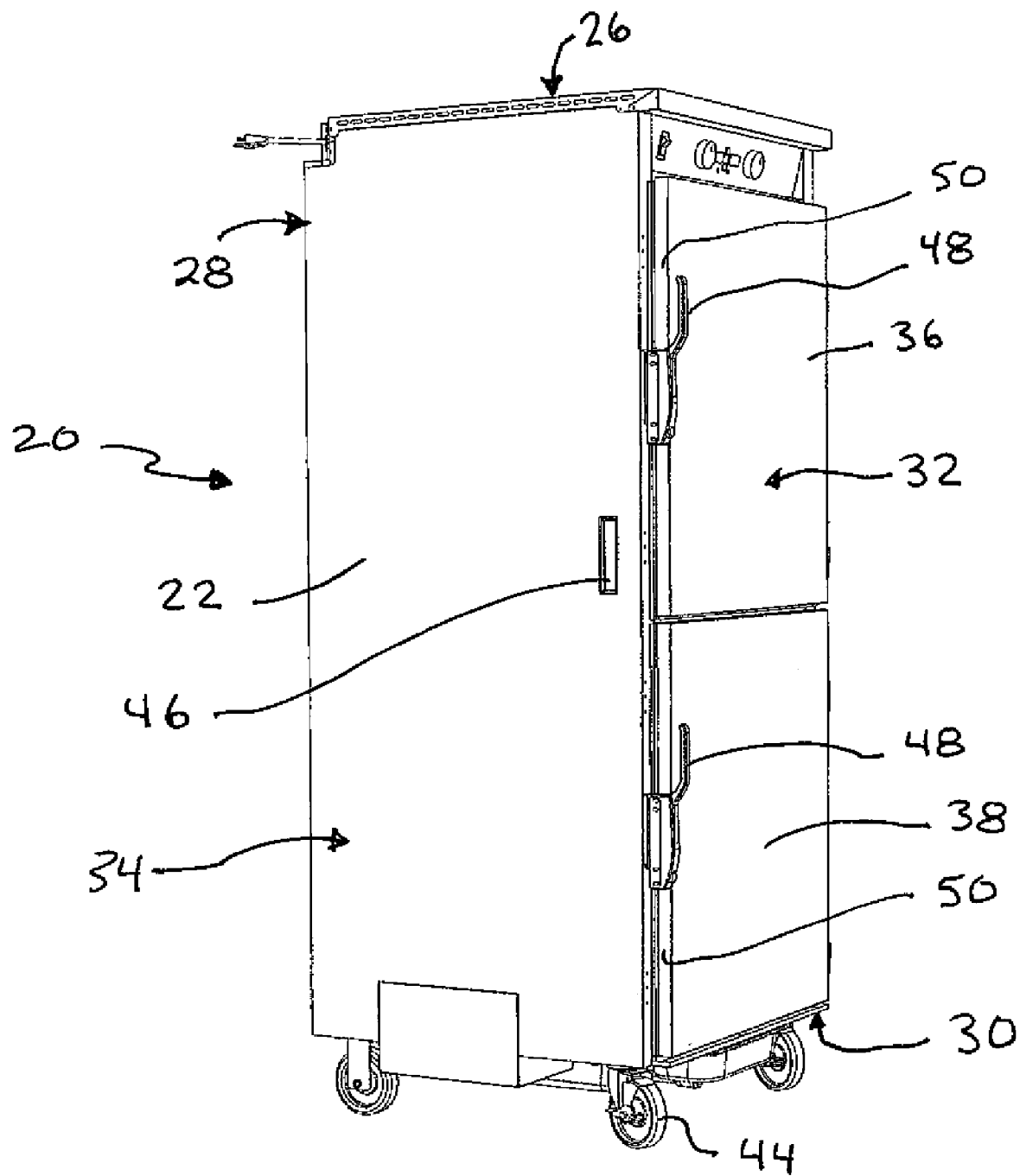
FIG. 1 is a left side perspective view of a food cabinet embodying the principles of the present invention.
Figure 2:
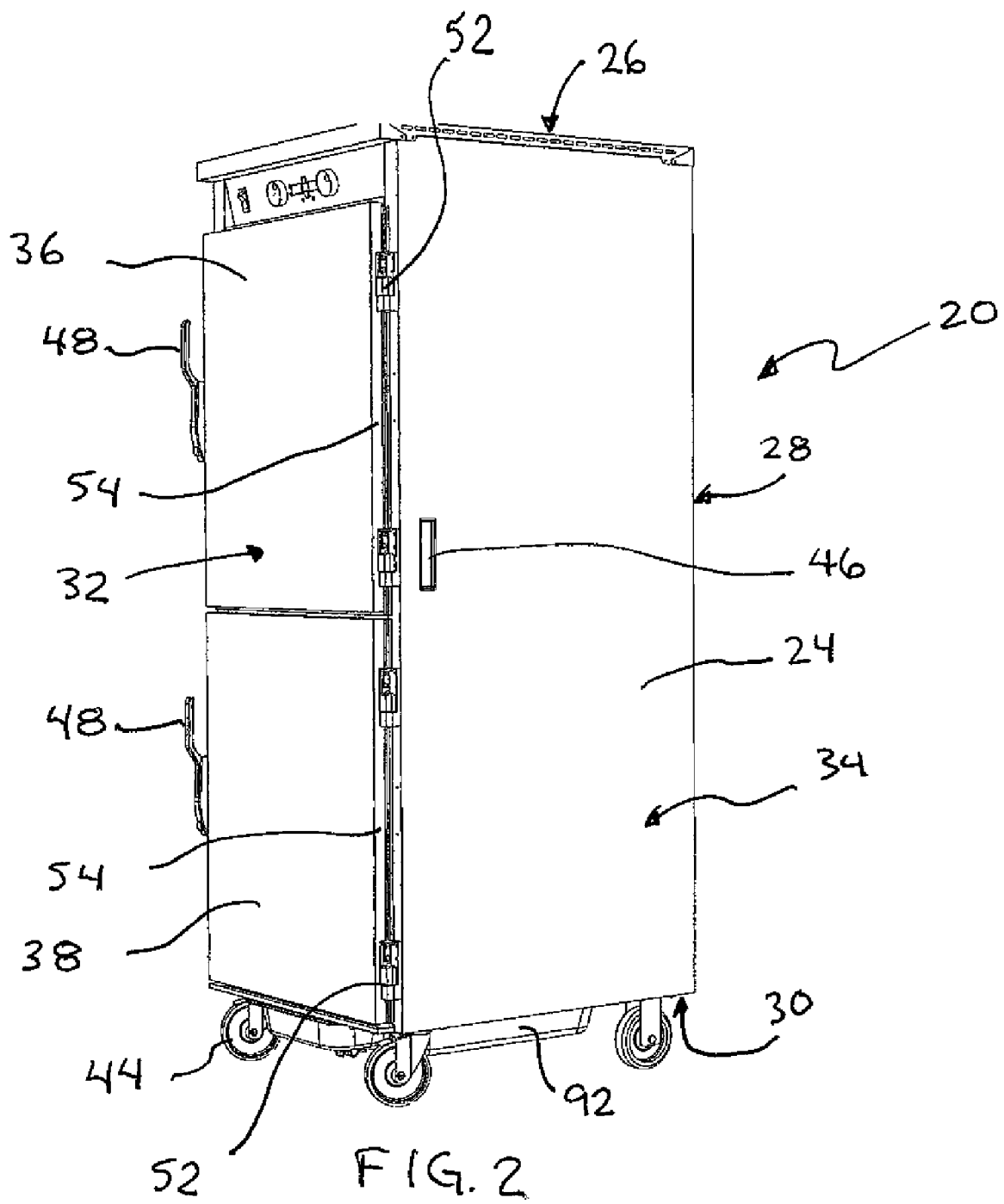
FIG. 2 is a right side perspective view of the food cabinet embodying the principles of the present invention.
Figure 3:
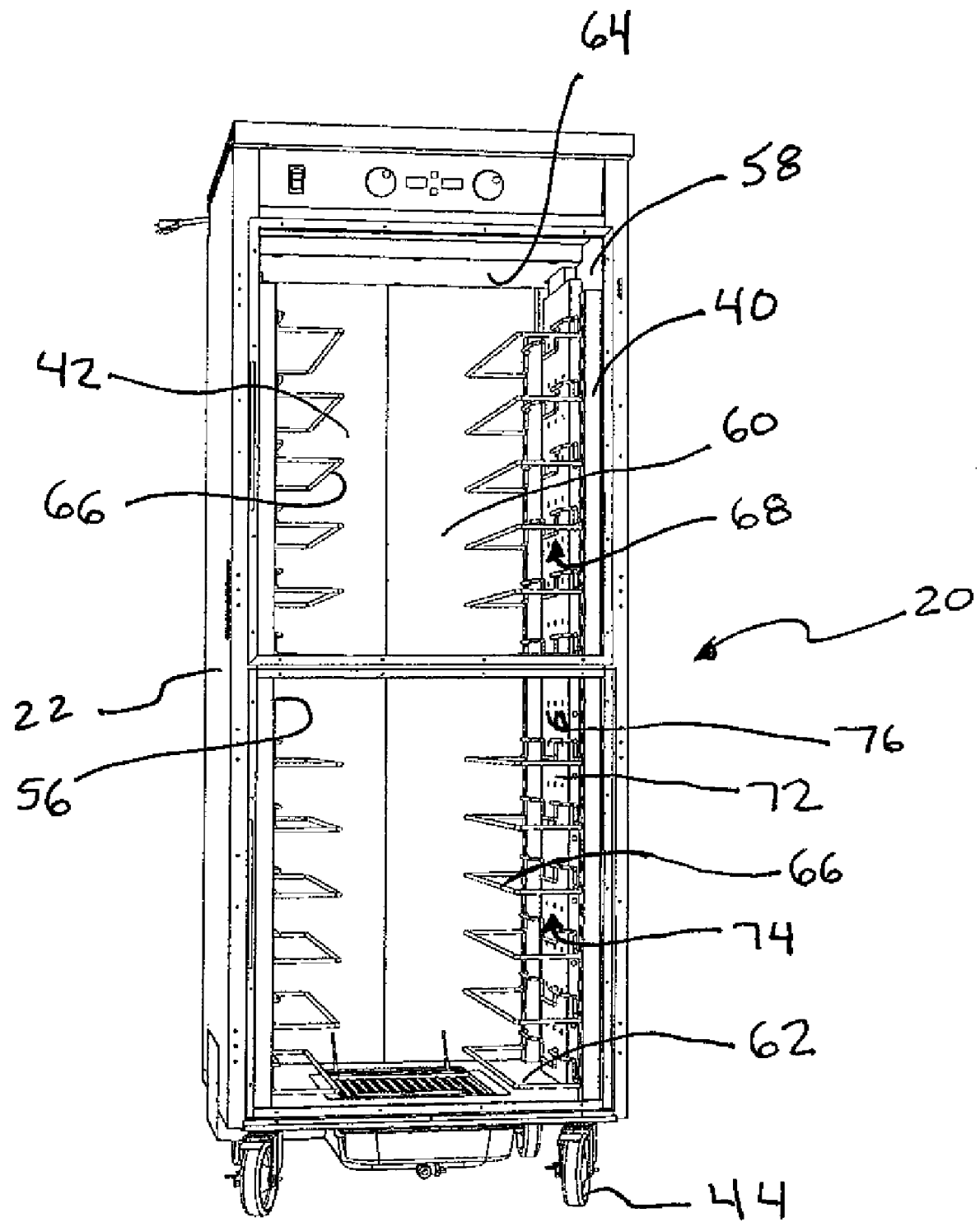
FIG. 3 is a front left perspective view of the food cabinet with the front doors removed.
Figure 4:
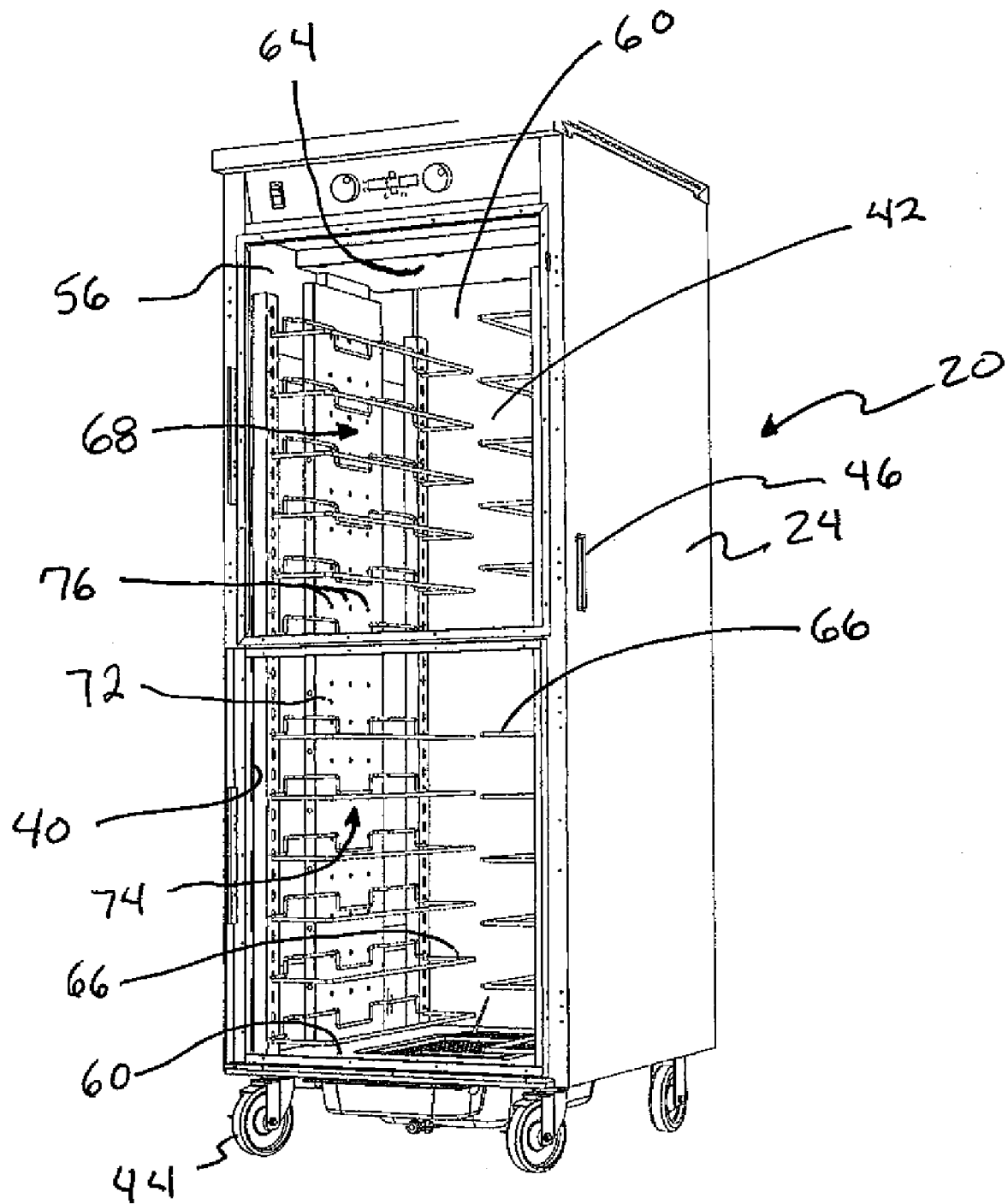
FIG. 4 is a front right perspective view of the food cabinet with the front doors removed.

An embodiment of the invention is illustrated in the FIGs. although the present invention can take the form of other embodiments which may vary from the one illustrated. In FIGS. 1 and 2, a food container or cabinet 20 is shown having a left side wall 22, a right side wall 24, a top wall 26, a rear wall 28, a bottom wall 30 and a front wall 32 defining an exterior 34 of the container. The front wall 32 is shown as having two openable doors 36, 38, which normally close at least one opening 40 (FIGS. 3 and 4) in the walls which provides access to an open interior 42 for receiving food items. In other embodiments, there may be only a single door, or there may be more than two doors, or doors on more than one side of the cabinet. By means of the doors 36, 38, food items may be moved into and out of the interior 42 of the cabinet.

The cabinet 20 may be provided with wheels or casters 44 as illustrated to allow for the cabinet to be easily movable, or it may have fixed feet if the cabinet is to remain stationary. If the cabinet 20 is provided with wheels 44, it may also have finger grip recesses 46 on the side walls 22, 24, to permit a user to easily grasp and move the cabinet. The doors 36, 38 are provided with handles 48 along one edge 50 and hinges 52 along an opposite edge 54 to allow the doors to be opened to provide access to the interior 42.

In the interior 42 there are provided inside side walls, 56, 58 a rear wall 60, a floor 62 and a ceiling 64. In those cabinets where the doors 36, 38 do not comprise the entire front wall 32, there may also be an interior front wall. In the embodiment illustrated, there are provided support elements 66 in the form of brackets secured to the interior side walls 56, 58 for receiving trays or shelves upon which the food items may be placed. In other embodiments, actual shelves, preferably with air openings therethrough, may be secured to the side walls 56, 58, or other types of support elements may be provided. The shelves or trays, as well as the brackets 66 may be removable and adjustable, so as to accommodate various types of food support members.

Figure 5:
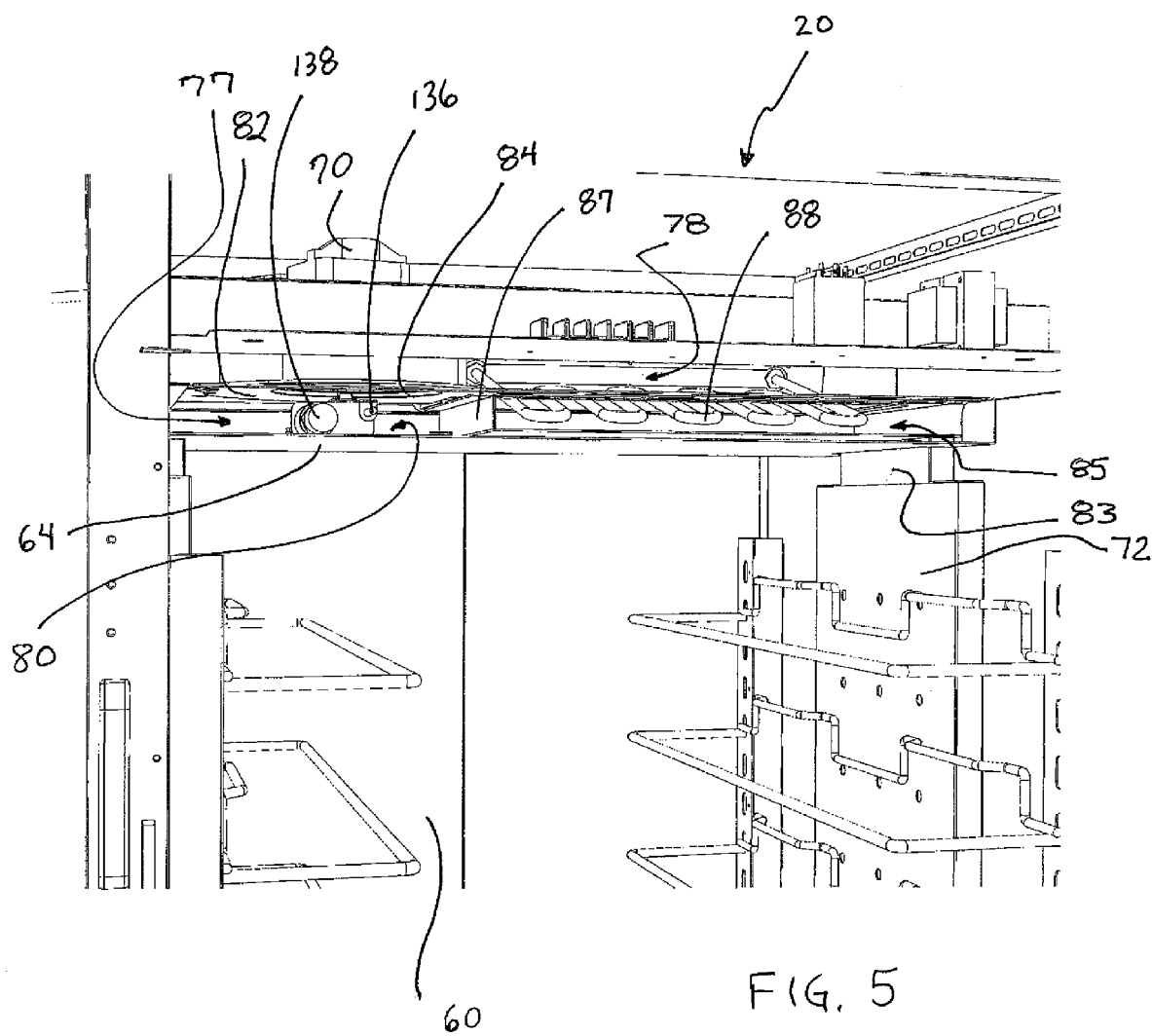
FIG. 5 is a partial, front perspective view of an area of the food cabinet above the ceiling.
Figure 6:
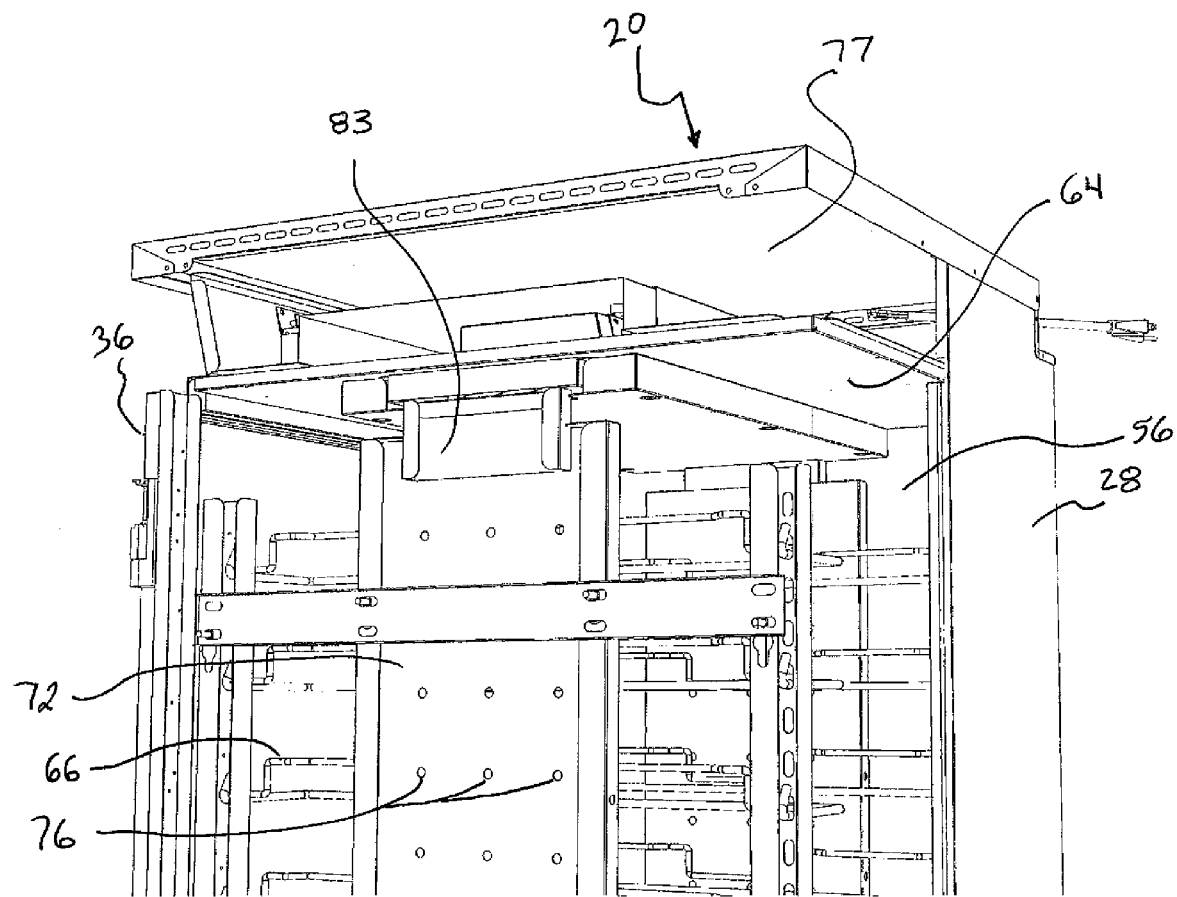
FIG. 6 is a partial side perspective view of an upper portion of interior of the food cabinet.
Figure 7:
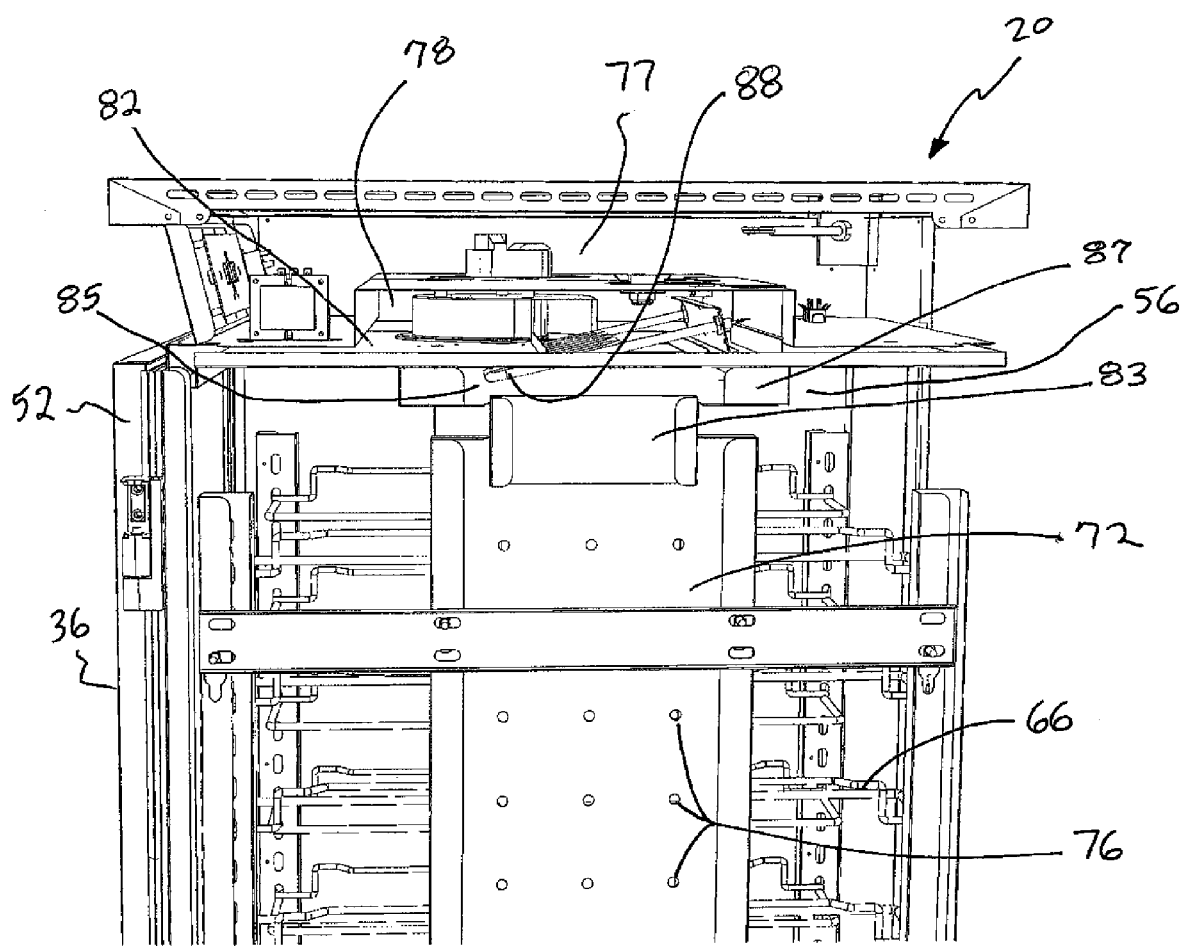
FIG. 7 is a partial side perspective view of an upper portion of interior of the food cabinet.
Figure 8:
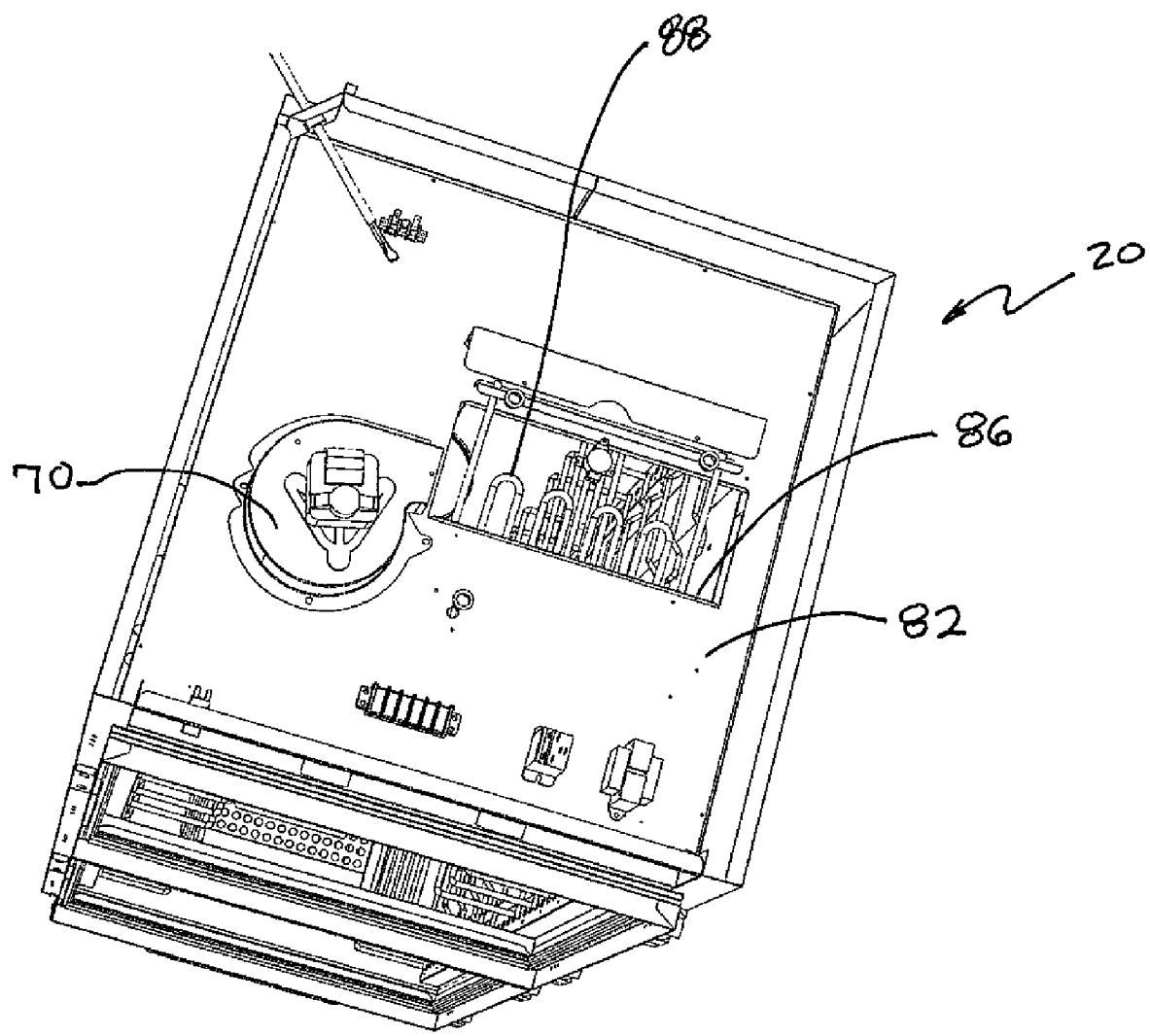
FIG. 8 is a top view of the area above the ceiling of the food cabinet.

The cabinet 20 includes at least one element for conditioning the air within the interior 42 of the cabinet. For example, one characteristic of the air that may be conditioned is the stationary or moving condition of the air, so there may be an air circulation system which includes ductwork 68 and an air moving device 70 such as a blower or fan (FIGS. 5 and 8). The ductwork 68 includes a channel 72 defining an air passage arranged vertically along a central portion 74 of each interior side wall 56, 58, extending from the floor 62 to the ceiling 64. The channels 72 are provided with air holes 76 along a height of the channels which permit air to flow out of and into the air passages defined by the channels, depending on the relative air pressure within the channels and in the interior 42 of the cabinet 20. The air passages defined by the channels 72 extend through the ceiling 64 into a plenum 77 located above the ceiling. The plenum 77 is divided into an upper chamber 78 and a lower chamber 80 by a horizontal wall 82. The air passages from the channels 72 communicate with the lower chamber 80 by means of transition ducts 83 (FIGS. 6 and 7).

The lower chamber 80 includes an opening 84 (FIG. 5) in the horizontal wall 82 which leads to the inlet of the air moving device 70. The air moving device pressurizes the air and causes an air stream to move in the upper chamber 78 towards and through an opening 86 leading to a second lower chamber 85 formed by an enclosure 87 mounted to an underside of the horizontal wall 82. Positioned at least partially in the opening 86 is an air heating element 88 which can be energized to heat the air in the air stream flowing into the second lower chamber 85. With the temperature of the air comprising another characteristic that may be conditioned, the air heating element 88 comprises another air conditioning element. In the North American market, the heating element 88 may be rated at 2000 W, 110-120 V. In other markets where 220-240 V is a more prevalent power supply, the heating element 88 may be designed to operate at those voltages.

The enclosure 87 prevents the air stream coming from the upper chamber 78 from flowing back into the inlet opening 84 leading to the air moving device 70, and therefore the air stream from the air moving device flows into the air passage behind the channel 72 on the right side interior wall 58. This pressurized air flows through the various air holes 76 in the channel 72 so that the air flows into the cabinet interior 42 at points all along the height of the side wall 58. The air passage behind the channel 72 on the left side interior wall 56 communicates directly with the inlet opening 84 leading to the air moving device 70, and therefore the pressure in that air passage is lower than in the cabinet interior 42, causing air to flow into the air passage through the air holes 76 in the left side channel 72. Thus, the ductwork 68 is configured to circulate the air stream in the interior 42 of the cabinet 20 and to direct at least a portion of the air stream through the interior of the cabinet adjacent to the food items stored in the cabinet.

By having the air holes 76 positioned all along the height of the cabinet 20, air flow is assured within the cabinet, even if the food items on one or more shelves are blocking the air holes at the level of that shelf. The air will continue to flow out of the other air holes 76 to maintain the heat and humidity at the desired levels throughout the cabinet 20. The cross flow of air from one side interior wall 58 to the other side wall 56 assures that the air flow within the cabinet 20 is primarily parallel to the door opening 40 of the cabinet, thereby creating an air curtain at the opening and substantially preventing a loss of heat from the interior of the cabinet.

Figure 9:
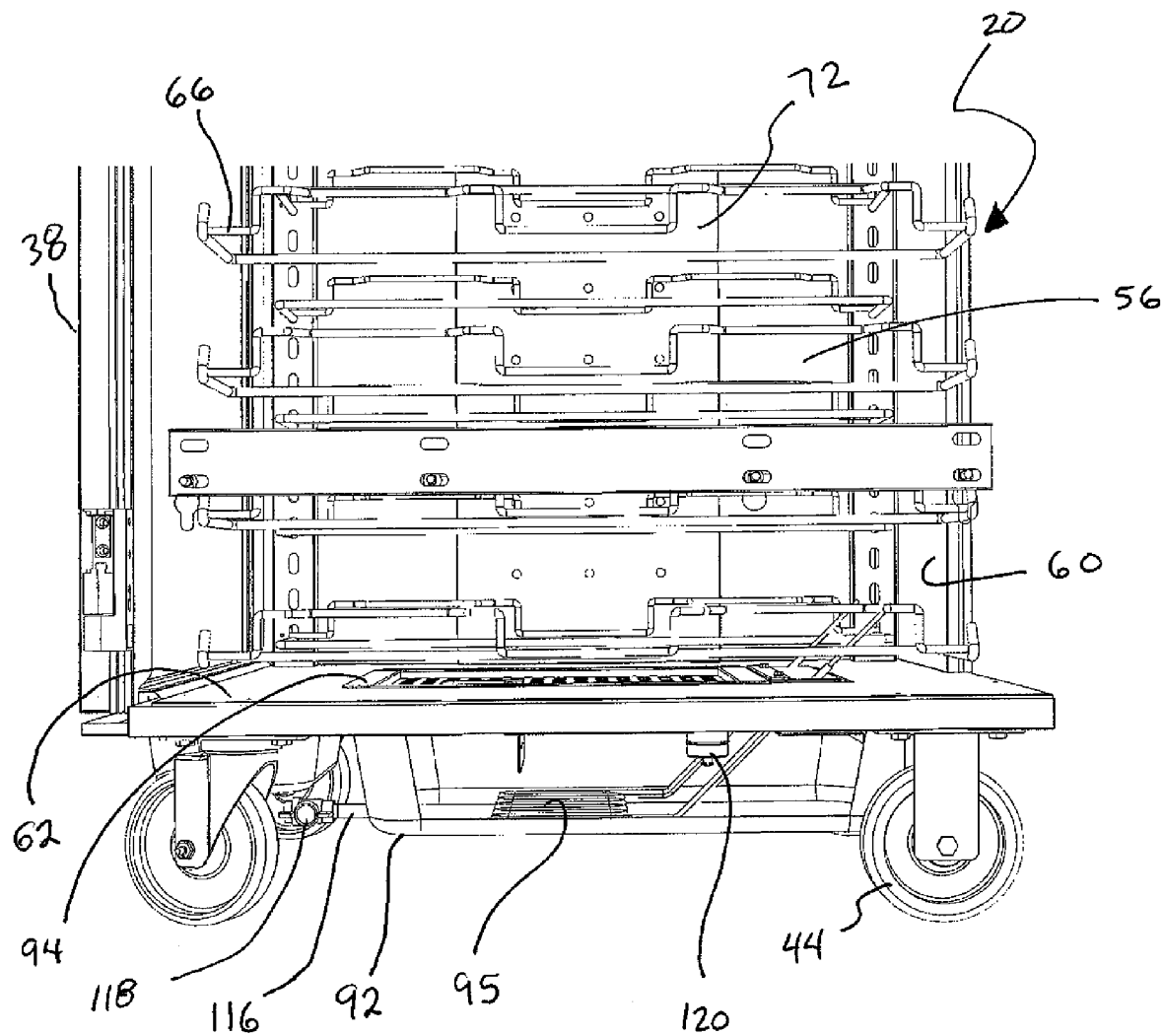
FIG. 9 is a side view of a lower portion of the food cabinet.
Figure 11:
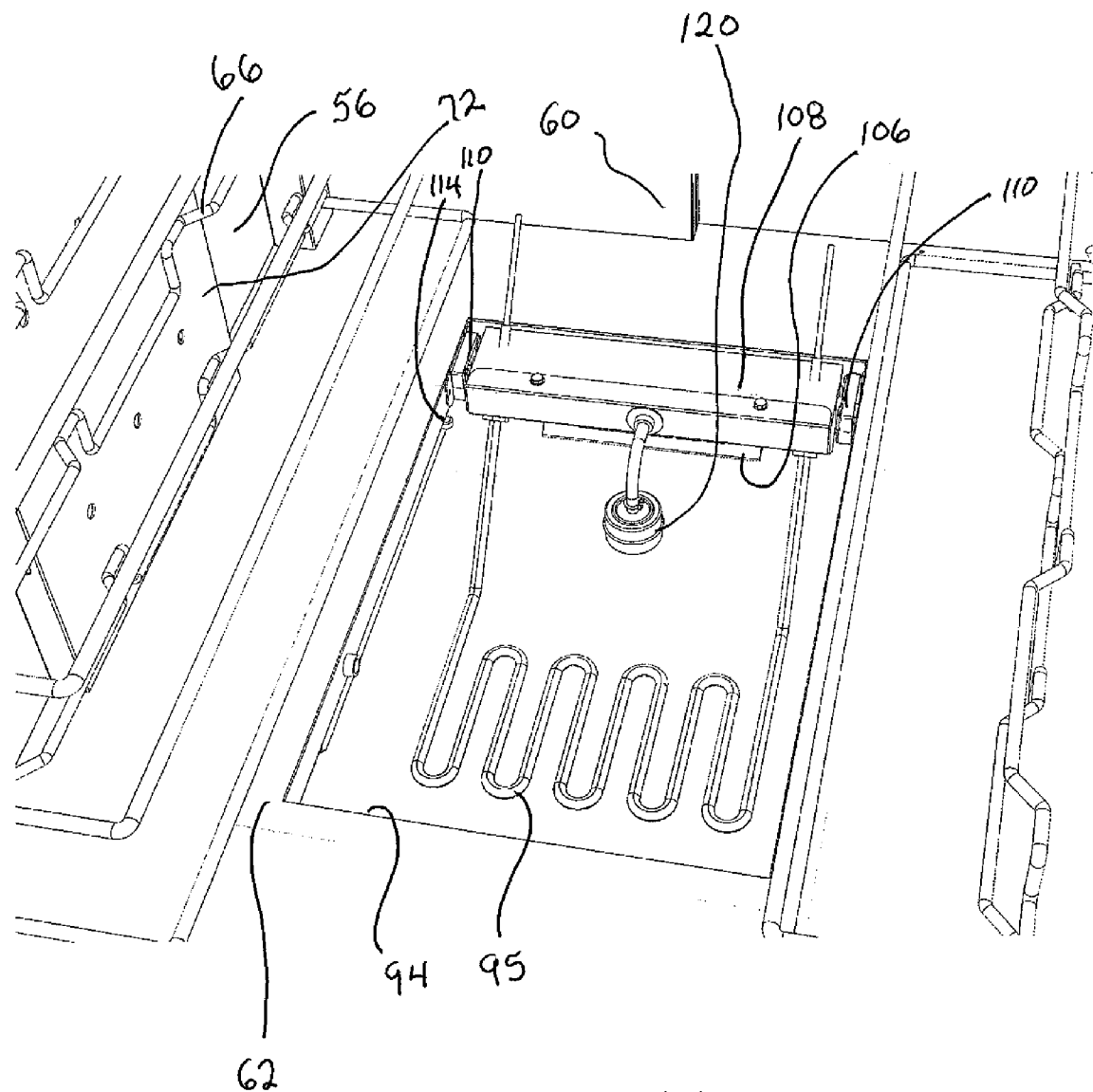
FIG. 11 is a top down perspective view of the floor of the food cabinet with a cover plate removed.

To provide an increase in the humidity characteristic of the air in the cabinet 20, a water receptacle 92 (FIG. 9) is provided for receiving a supply of water. The receptacle 92 is located below the floor 62 of the cabinet 20, and an opening 94 is provided in the floor to allow evaporated water to be picked up by the air flowing through the interior 42 of the cabinet since the air flow within the cabinet will be directed in a generally horizontal manner above the receptacle. In order to increase the rate of evaporation of the water in the receptacle 92, a water heating element 95 is arranged to add heat energy to the water (FIGS. 9 and 11). This water heating element 95 comprises another air conditioning element since it is used to increase the humidity characteristic of the air in the cabinet 20. In the embodiment illustrated, the water heating element 95 extends down into the receptacle 92 such that it would be immersed in the supply of water in the receptacle. In other embodiments, the water heating element 95 could be positioned below or adjacent to, or formed in the walls of the receptacle 92. In the North American market, the heating element 95 may be rated at 2000 W, 110-120 V. In other markets where 220-240 V is a more prevalent power supply, the heating element 95 may operate at those voltages.

Figure 10:
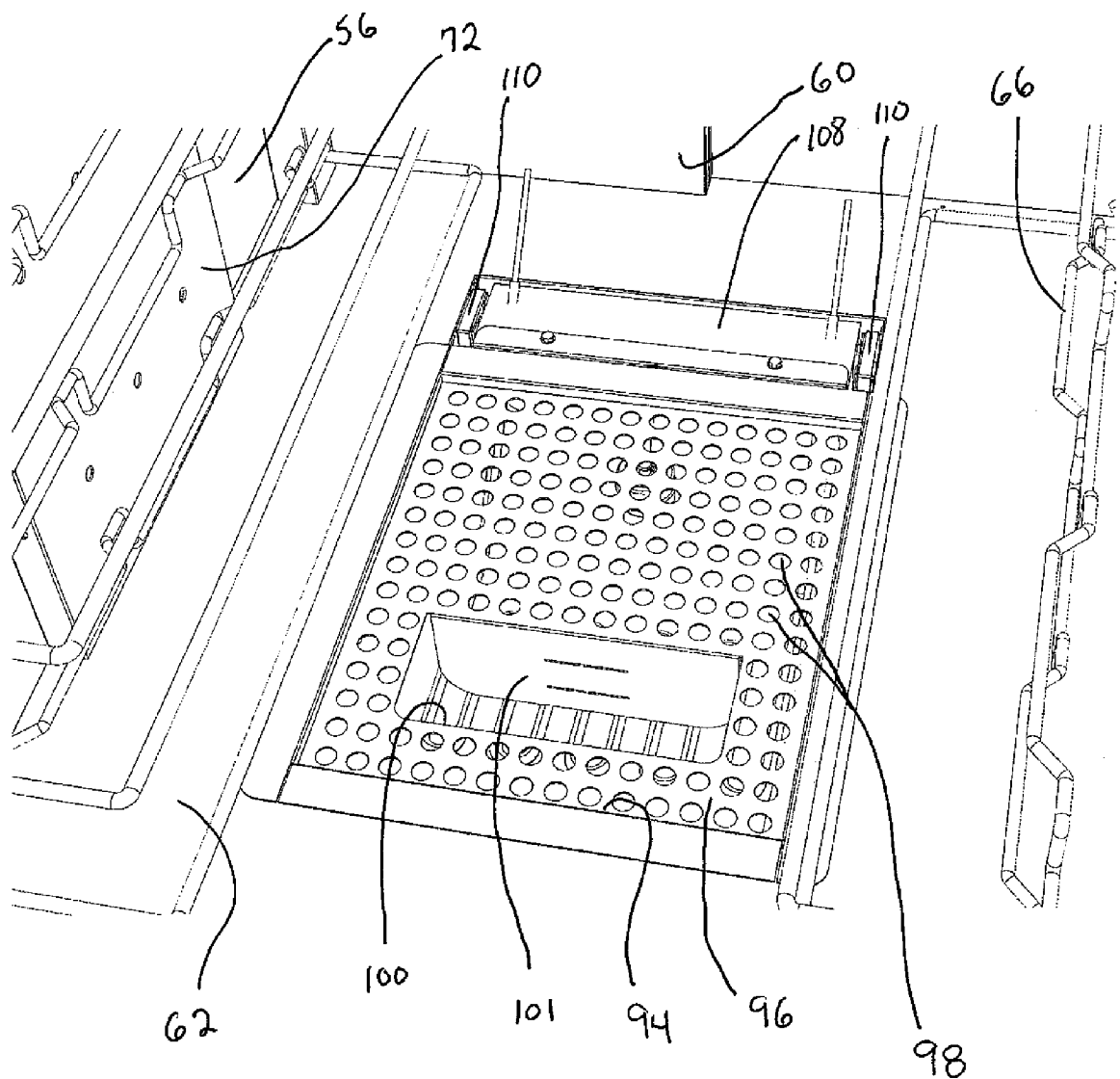
FIG. 10 is a top down perspective view of the floor of the food cabinet.

The opening 94 in the floor 62 of the cabinet 20 may be provided with a cover plate 96 (FIG. 10) which is perforated with large enough holes 98 to permit water vapor to flow up through the cover plate, yet to prevent a person from extending their fingers through the holes, and to prevent other large objects from falling through the opening 94 so that the objects will not inadvertently touch the water heating element 94, particularly when it is hot. The cover plate 96 may also be provided with a much larger opening 100 to allow for easy filling of the receptacle 92 with water, such as from a separate container or hose. A portion 101 of the cover plate 96 which is removed to create the opening 100 may be folded down into the receptacle 92 as a guard against backsplash of water as it is being poured into the receptacle 92 and to prevent direct access to the water heating element 95 through the opening 100.

Figure 12:
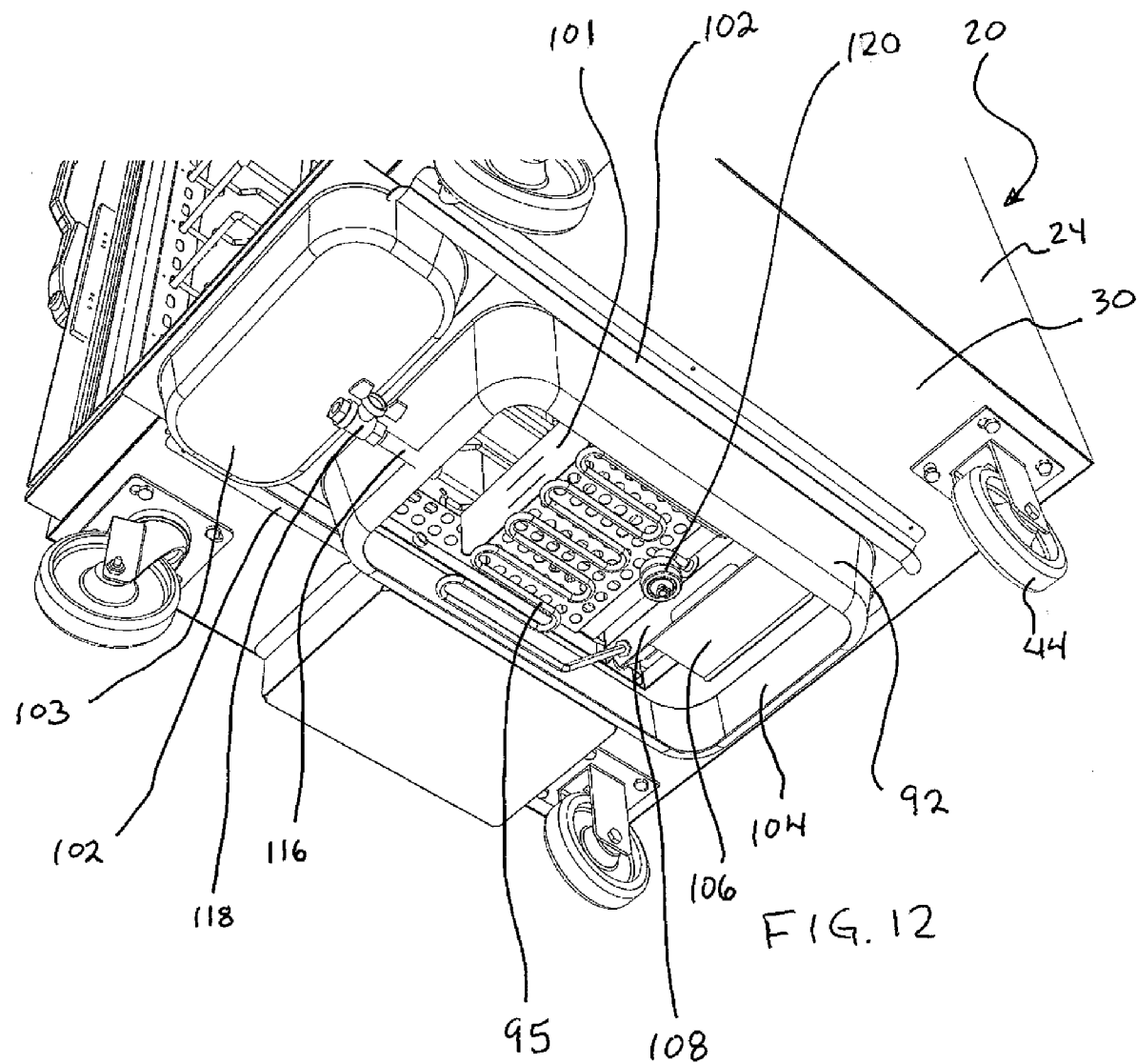
FIG. 12 is a bottom up perspective view of the bottom of the food cabinet with a portion of the water receptacle removed.
Figure 13:
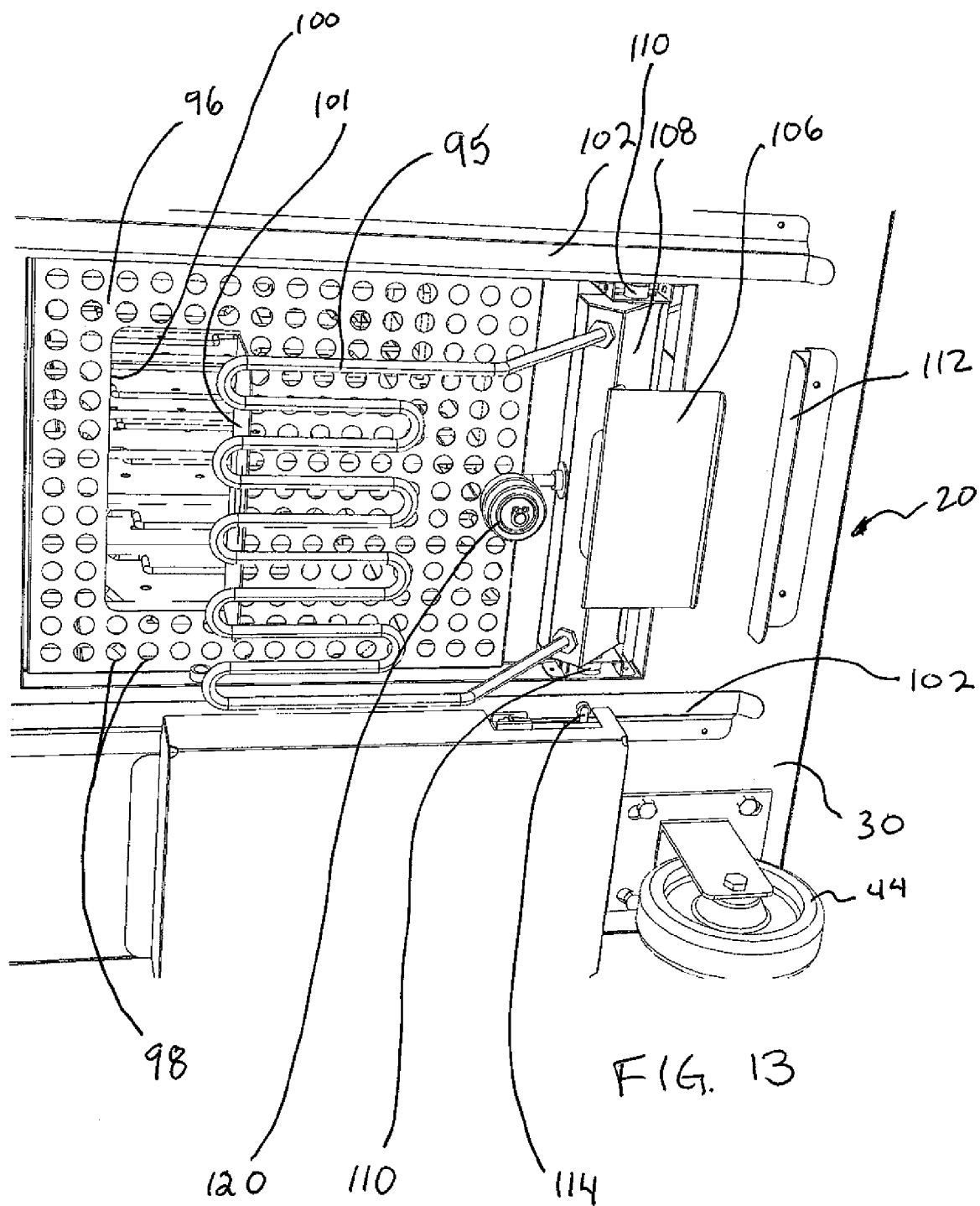
FIG. 13 is a bottom up perspective partial view of the bottom of the food cabinet with the water receptacle completely removed.
Figure 14:
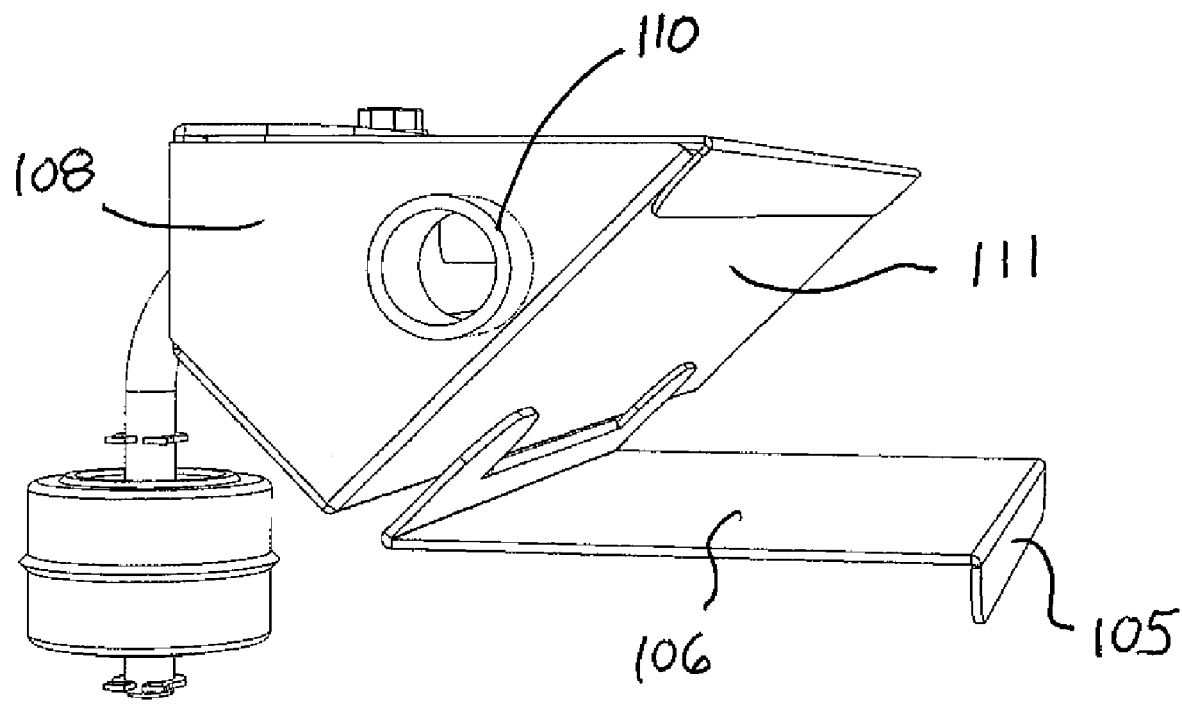
FIG. 14 is an isolated perspective side view of the water heating element mounting bar.

In the embodiment shown, the water receptacle 92 may be removed from the cabinet 20 for ease in cleaning of the receptacle in the event that small food particles and other debris fall into the receptacle. The receptacle 92 is slidably mounted on rails 102 (FIG. 12) and may easily be removed by removing the cover plate 96 and then first sliding a condensate pan 103 out for disposal of any collected condensate, and then sliding the receptacle out for cleaning and then replacement. As the receptacle 92 is slid forwardly, a back wall 104 engages a flange 105 on a depending panel 106 (FIGS. 10-14) mounted on a heating element mounting bar 108, causing the mounting bar to pivot on its journalled mounting 110. The heating element 95 is pivoted up and out of the way of the walls of the receptacle 92 to an over-center position automatically and remains in this elevated, over-center position until the receptacle is replaced.

When the receptacle 92 is replaced, the back wall 104 engages an angled back wall 111 of the mounting bar 108, which was pivoted into a position behind and below the top of the receptacle back wall 104 when the receptacle was removed. The engagement of the receptacle back wall 104 with the mounting bar back wall 111 causes the mounting bar to pivot back to the initial position, as shown in FIG. 9, with the water heating element 95 returned to a position within the receptacle. The pivoting action of the water heating element 95 occurs automatically upon the removal and replacement of the receptacle 92, and therefore the user does not need to take any additional steps to move the water heating element out of the way to effect removal of the receptacle nor to effect replacement of the receptacle. A stop 112 (FIG. 13) is provided to engage the receptacle 92 when it is returned to its operating position. A limit switch 114 is also provided to prevent the heating element 95 from being energized if the receptacle 92 is not replaced into its correct position.

The receptacle 92 may be provided with a drain conduit 116 controlled by a manually operated valve 118 to allow for the draining of any remaining water from the receptacle when it is not in use, or is being cleaned. A water level sensor 120 may be provided in the receptacle 92 so that an appropriate signal, such as a visual or audible signal, may be provided to a user when the water level in the receptacle drops below a predetermined level, and also to deenergize the heating element 95 when the water level is too low.

Figure 15:
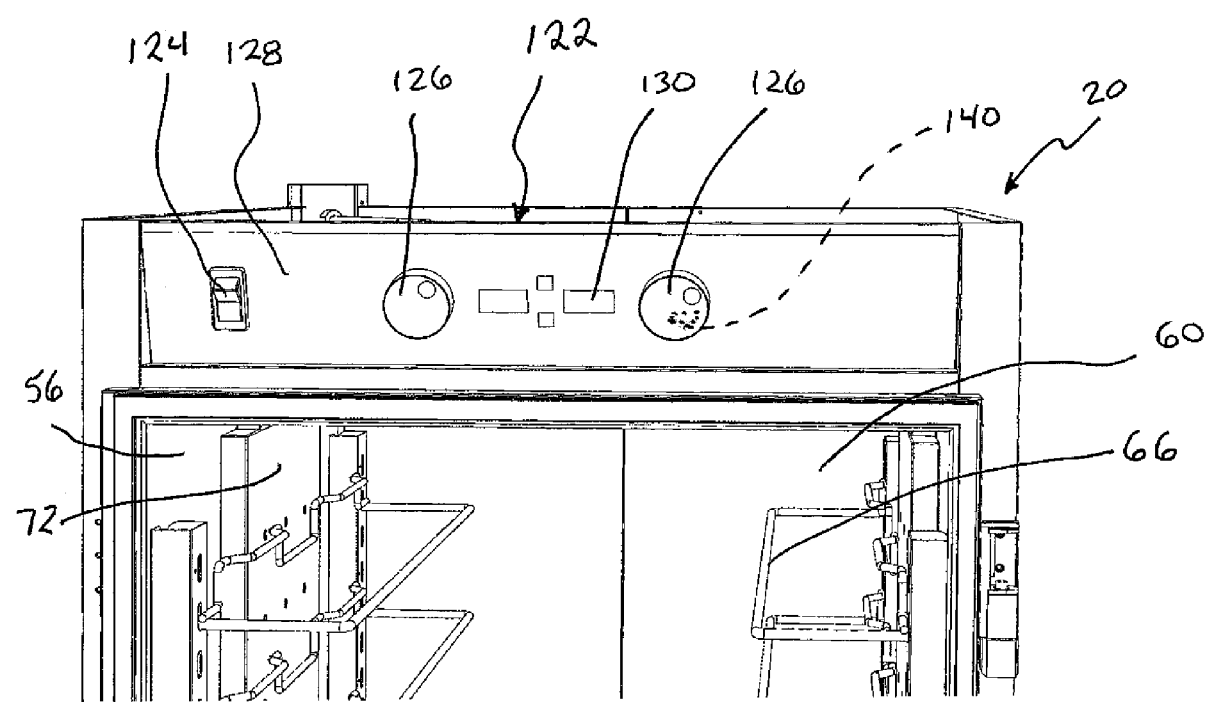
FIG. 15 is a front view of a control panel area of the food cabinet.
Figure 16:
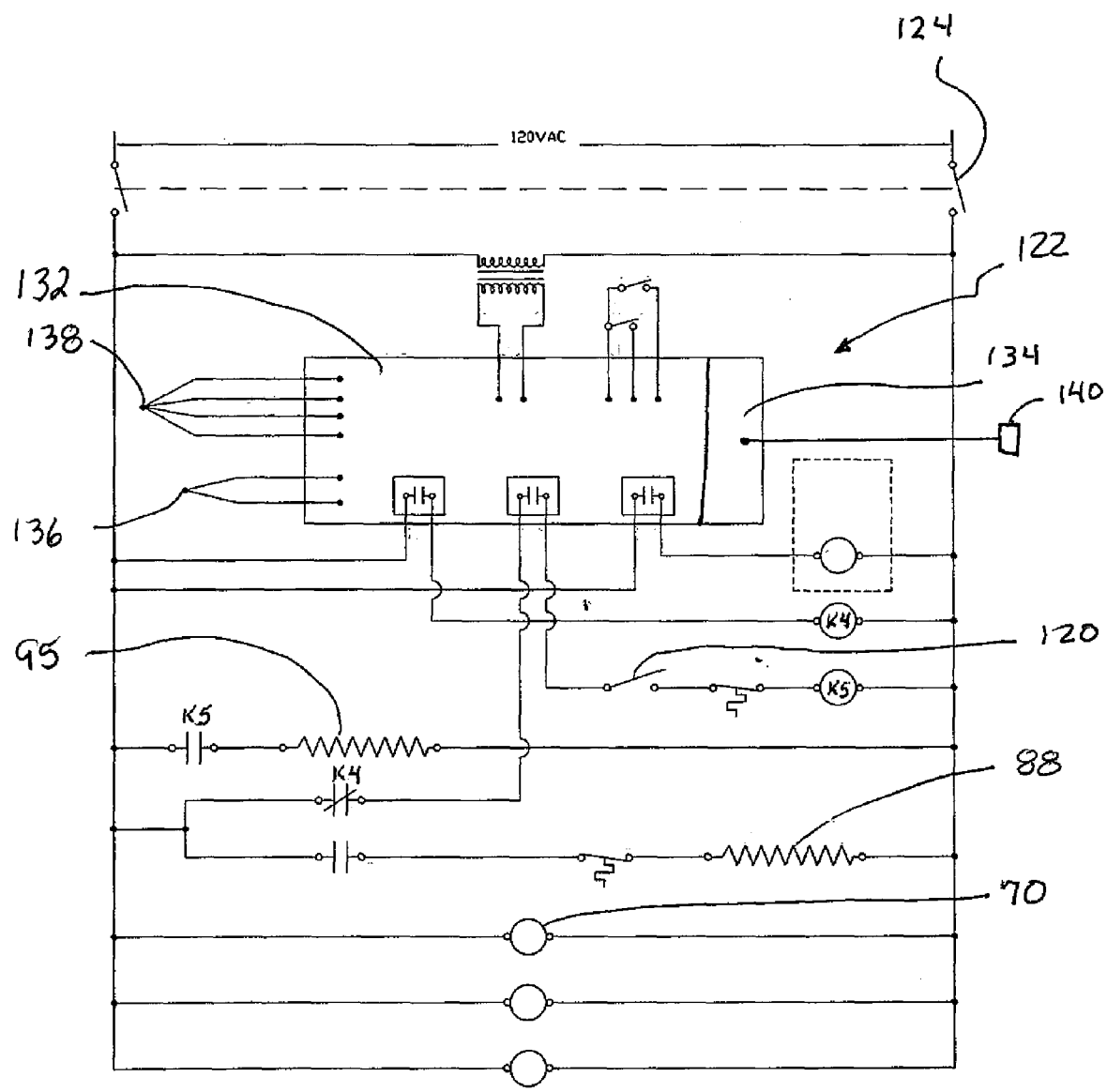
FIG. 16 is a schematic diagram of the control for the food cabinet.

A control 122 (FIGS. 15 and 16) having a power switch 124, input knobs 126 on a control panel 128 for inputting a desired temperature and humidity as well as displays 130 for displaying selected and/or current temperatures and humidity levels and other information, is arranged to operate the air heating element 88 and water heating element 95 alternately and not simultaneously, particularly for the North American market cabinets 20. In this manner a much larger heating element may be provided, on the order of 2000 W each, for the two heating elements, providing for much faster heating of the air and for much faster heating of the water in the cabinet 20. The control 122 may include a microprocessor 132 for carrying out steps of a control program and for issuing appropriate signals to control the heating elements and the air moving device, and any other electrical components in the cabinet 20. The control 122 may also include a digital electronic memory device 134 for storing the control program and other data used by the control. The control program may be configured such that the control 122 gives priority to air temperature demands over humidity increase demands so that if both an air temperature increase demand and a humidity increase demand are received, the air temperature increase demand will be met first, via energization of the air heating element 88, and then after the air heating element is deenergized, the water heating element 95 will be energized.

One or more temperature sensors 136 and humidity sensors 138 (FIGS. 5 and 16) may be arranged at appropriate locations in the cabinet 20 to provide electrical inputs to the control 122 permitting the control to properly operate the water heating element 95, the air heating element 88 and the air moving device 70 to achieve the levels selected by the user.

The control 122 is provided with an interface 140 for connecting the control with a source of electrical signals and data, such that the control program and data stored in the electronic memory device 134 can be replaced, changed or updated without requiring the replacement of physical components of the control. The interface 140 may be an electrical socket connector, such as an RS 232 socket, a USB socket, or a TEAclipper socket, or the interface may be an infrared receiver, an RF receiver, or other known types of interfaces. The interface 140 may be relatively small in size, and can therefore be placed behind one of the input knobs 126, since the interface would have to accessed only rarely. Such a placement would shield the interface 140 somewhat from dirt, grease and other potentially interfering foreign materials, and would also shield the interface from unauthorized interference.

Figure 17:
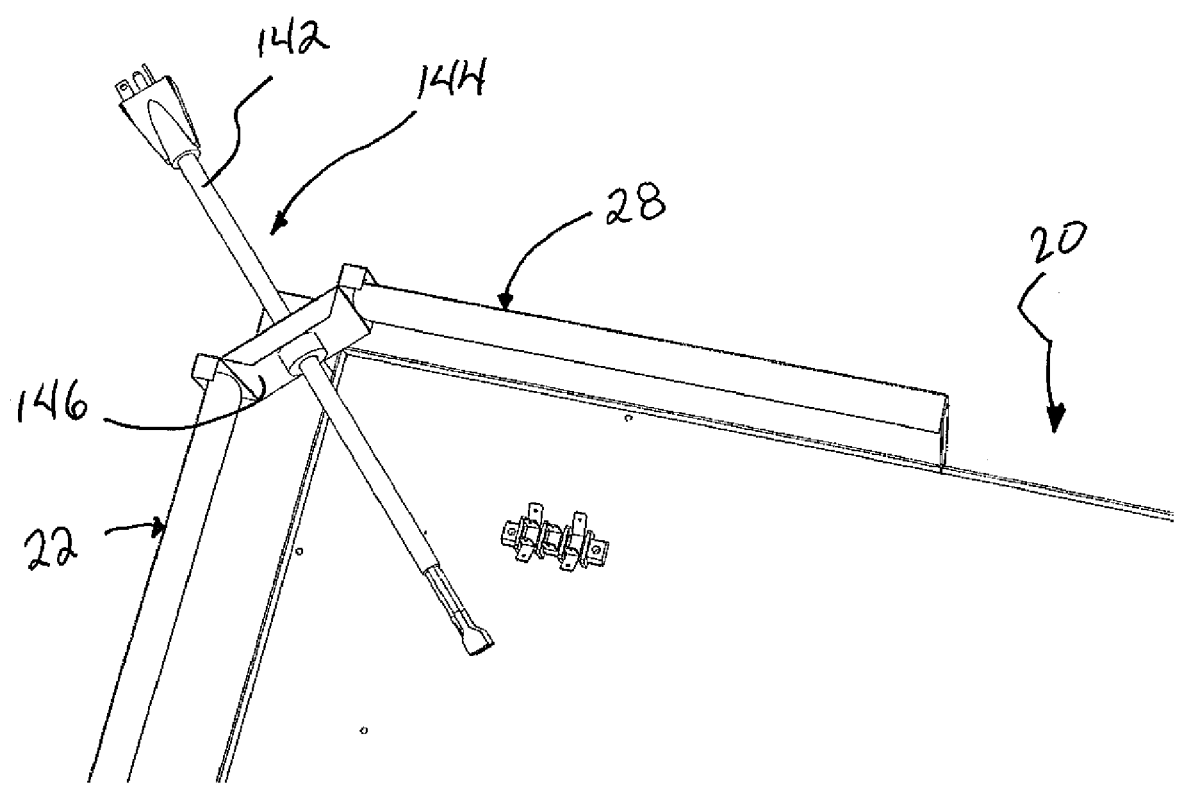
FIG. 17 is a top view of a corner of the food cabinet showing the installation of the power cord.
Figure 18:
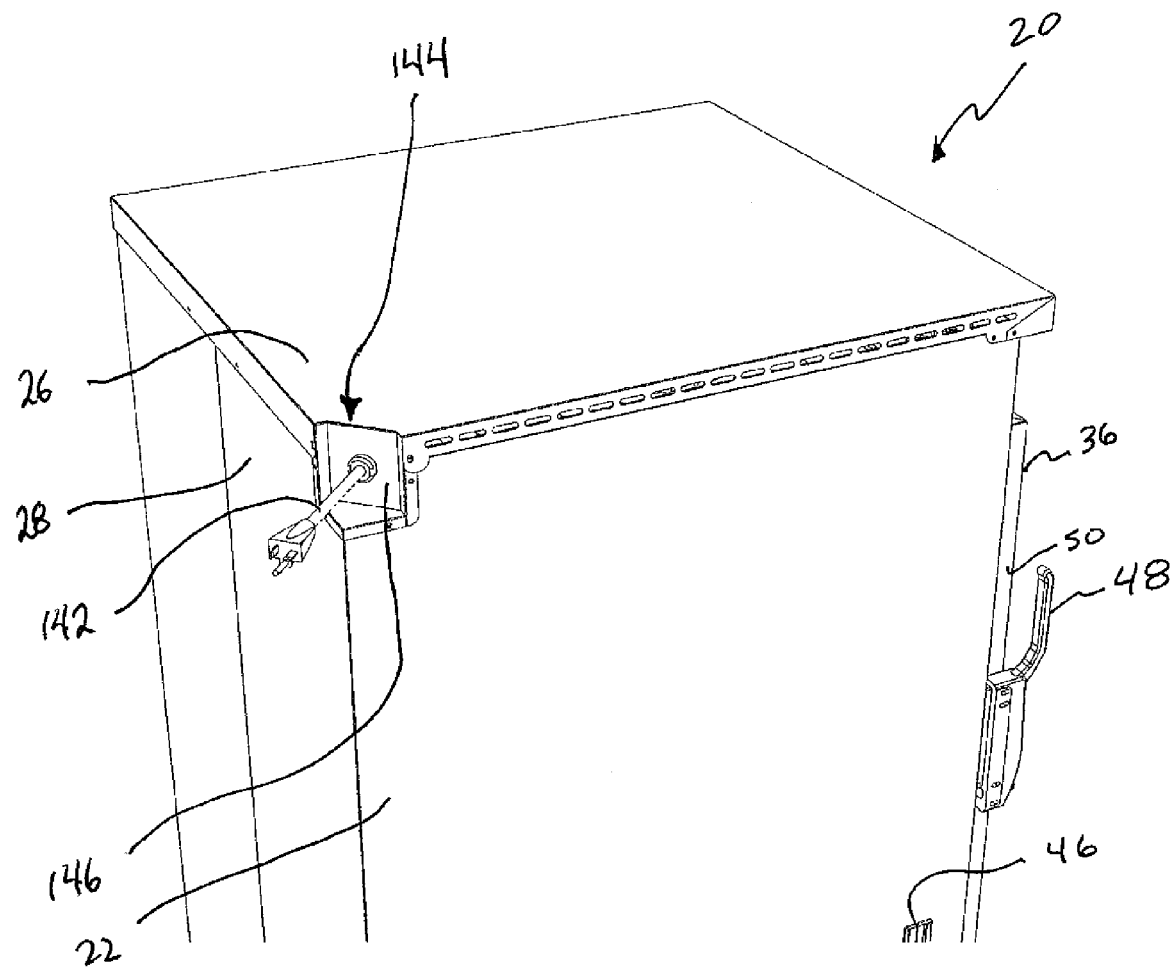
FIG. 18 is a side perspective view of the corner of the food cabinet showing the installation of the power cord.

A power cord 142 used to provide electrical power to the various components in the cabinet 20 extends to the exterior of the cabinet (FIGS. 17 and 18) and exits from the cabinet at a corner 144 of one of the side walls 22, 24, the top wall 26 and the rear wall 28. A separate wall 146 is located at the corner 144 and is arranged at a non-right angle relative to each of the side walls 22, 24, the top wall 26 and the rear wall 28, such that a generally triangular cut-out is provided. With the power cord 142 exiting the cabinet in this manner, the cord can be extended towards either side, the rear, the top and the bottom without projecting perpendicularly out of a wall and thereby preventing the cabinet 20 from being placed essentially flush up against an adjacent wall or corner.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A food container comprising:

walls defining an exterior of the container and an open interior for receiving food items;

at least one opening in the walls which provides access to move food items into and out of the interior of the container;

an air moving device for creating a moving air stream, ductwork configured to circulate the air stream in the container;

the ductwork being configured to direct at least a portion of the air stream through the interior of the container adjacent to the food items;

a 1200 W to about 2000 W air heating element operated by a 110-120 V power supply located in the air stream;

a water receptacle for receiving a supply of water;

the ductwork being configured to direct at least a portion of the air stream over the supply of water;

a 1200 W to about 2000 W water heating element operated by a 110-120 V power supply arranged to add heat energy to the supply of water in the water receptacle; and a control arranged to operate the air and water heating elements alternately and not simultaneously.

2. A food container according to claim 1, wherein the opening is closed by at least one door.

3. A food container according to claim 1, wherein the water receptacle is located below a bottom wall of the cavity and a perforated panel overlies the water receptacle and forms a portion of a floor of the cavity.

4. A food container according to claim 1, wherein the container has opposed side walls adjacent to the opening and at least a portion of the ductwork is positioned vertically along an interior side of the side walls, the ductwork having perforations in it to allow air to enter and exit the ductwork along its length.

5. A food container according to claim 1, wherein the heating element is disposed in the water receptacle so as to be submerged in water in the water receptacle.

6. A food container according to claim 1, wherein the ductwork configuration includes holes for directing the air stream through the interior of the cabinet generally parallel to the closed door of the cabinet.

7. A food container according to claim 1, including a power cord extending to the exterior of the cabinet and exiting from the cabinet at a corner of a side wall, a top wall and a back wall.

8. A food container according to claim 1, wherein the control includes a microprocessor and a digital storage device for storing instructions for the microprocessor, and including an interface provided at an exterior of the cabinet via which electronic signals can be directed to or received from the microprocessor or digital storage device.

9. A food container according to claim 1, wherein the water receptacle is removable and replaceable in association with the cabinet.

10. A food container comprising:

walls defining an exterior of the container and an open interior for receiving food items;

at least one opening in the walls which provides access to move food items into and out of the interior of the container;

an air moving device for creating a moving air stream, ductwork configured to circulate the air stream in the container;

the ductwork being configured to direct at least a portion of the air stream through the interior of the container adjacent to the food items;

an air heating element located in the air stream;

a water receptacle for receiving a supply of water;

the ductwork being configured to direct at least a portion of the air stream over the supply of water;

a water heating element arranged to add heat energy to the supply of water in the water receptacle;

a control arranged to control a temperature and a humidity within the cabinet;

the control including a microprocessor and a digital storage device for storing instructions for the microprocessor; and an interface provided at an exterior of the cabinet via which electronic signals can be directed to or received from the microprocessor or digital storage device.

11. A food container according to claim 10, wherein the ductwork configuration includes holes for directing the air stream through the interior of the cabinet generally parallel to the closed door of the cabinet.

12. A food container according to claim 10, including a power cord extending to the exterior of the cabinet and exiting from the cabinet at a corner of a side wall, a top wall and a back wall.

13. A food container according to claim 10, including at least one temperature sensor connected to the control.

14. A food container according to claim 10, including at least one humidity sensor connected to the control.

15. A food container according to claim 10, including air nozzles arranged to direct jets of air across an opening closed by the door at the front wall.

16. A food conditioning container comprising:

walls defining an exterior of the container and an open interior for receiving food items;

at least one opening in the walls which provides access to move food items into and out of the interior of the container;

at least one electrically operated air conditioning element positioned within the cabinet to condition at least one characteristic of the air, a power cord extending to the exterior of the cabinet and exiting from the cabinet at a corner of a side wall, the top wall and the back wall.

17. A food container according to claim 16, wherein the air conditioning element comprises an air heater.

18. A food container according to claim 16, wherein the air conditioning element comprises an air humidifier.

19. A food container according to claim 16, wherein the air conditioning element comprises an air moving device.

20. A food container according to claim 16, including a control arranged to operate an air heating element and an air humidifying element alternately and not simultaneously, wherein the control includes a microprocessor and a digital storage device for storing instructions for the microprocessor, and including an interface provided at an exterior of the cabinet via which electronic signals can be directed to or received from the microprocessor or digital storage device.

21. A food conditioning container comprising:

walls defining an exterior of the container and an open interior for receiving food items;

at least one opening in the walls which provides access to move food items into and out of the interior of the container;

a removable water receptacle positioned within the container to provide a source of humidity for air within the cabinet;

at least one electrically operated water heating element positioned within the receptacle to heat water contained in the water receptacle, the water heating element being mounted in a pivotable fashion such that as the water receptacle is removed from the container, the water heating element is automatically pivoted out from within the water receptacle and as the water receptacle is returned to the container, the water heating element is automatically pivoted into the receptacle.

22. The food conditioning container of claim 21, wherein the water receptacle is slidably mounted in the container.

23. The food conditioning container of claim 21, wherein the water heating element is mounted on a mounting bar that is pivotally journalled in the container.

24. The food conditioning container of claim 23, wherein the mounting bar includes an extension member that is engaged by a wall of the water receptacle as the water receptacle is removed from the container, the engagement causing the mounting bar to pivot.

25. The food conditioning container of claim 23, wherein the mounting bar includes a wall that is engaged by a wall of the water receptacle as the water receptacle is returned to the container, the engagement causing the mounting bar to pivot.

* * * * *